United States Patent [19]

Orren

[11] Patent Number: 4,600,098

[45] Date of Patent: Jul. 15, 1986

[54] PLATE FOR OSCILLATING-TYPE TRANSPORTER

[75] Inventor: David R. N. Orren, Saint Germain en Laye, France

[73] Assignee: Fuller Company, Bethlehem, Pa.

[21] Appl. No.: 590,946

[22] Filed: Mar. 19, 1984

[30] Foreign Application Priority Data

Mar. 24, 1983 [FR] France ............................... 83 04861

[51] Int. Cl.[4] .............................................. B65G 25/00

[52] U.S. Cl. .................................... 198/773; 110/278; 110/281

[58] Field of Search ............... 198/773, 774, 775, 776, 198/777, 952; 110/278, 281, 282, 283, 289, 290, 291, 328; 126/174, 175

[56] References Cited

U.S. PATENT DOCUMENTS 2,431,799 12/1947 Gaffney .............................. 110/328

4,030,206 6/1977 Bode .................................. 110/328

4,239,029 12/1980 Martin et al. ....................... 110/281

4,350,244 9/1982 Heinemann et al. ................ 198/773

4,450,952 5/1984 Steiner ............................... 198/773

*Primary Examiner*—Joseph E. Valenza

*Assistant Examiner*—D. Glenn Dayoan

*Attorney, Agent, or Firm*—Frank H. Thomson

[57] ABSTRACT

A grate plate and a combination of a grate plate and support apparatus for a reciprocating grate type material transport apparatus. The support apparatus includes spaced apart forward posts having an interconnecting transverse bar and spaced apart rearward posts having an interconnecting transverse bar. The grates include a transverse lower rib with a protrusion which permits the grate to be secured to the forward posts. The grate includes downwardly extending wings along each side. The rear end of each wing includes a detent that cooperate with the bar interconnecting the rear posts. Protrusions in the midsection of the grate rest on the forward posts. Each grate is thus supported at four points.

6 Claims, 7 Drawing Figures

PLATE FOR OSCILLATING-TYPE TRANSPORTER

This invention relates to an oscillating or reciprocating grate type material transport mechanism. More particularly, this invention relates to a grate plate for use in a reciprocating grate system for simultaneously transporting and cooling hot particulate material such as hot cement clinker which has been discharged from a rotary kiln and commonly referred to as a clinker cooler.

Material transport mechanisms or conveyors of the type to which the present invention relates are made up of a plurality of juxtaposed grate plates which form rows of grate plates which rows extend transverse to the direction of material flow along the conveyor. The conveyor is designed so that movable or reciprocating rows of grates alternate with rows of grates that are fixed. The grates in one row overlap the grates in an adjacent row. When the movable rows are reciprocated a bed of material supported by the grates is transported along the length of the length of the conveyor.

When a material conveyor of this type is used for transporting and cooling hot clinkers the grate plates will have a plurality of holes therethrough and cooling air is blown up through the grates and the bed of material to thereby cool the material. When used in this type of application, both the fixed plates and the movable grates are subjected to major stresses and must, on the one hand, be solidly attached to their respective supports and, on the other hand, be easily removable from these same supports with a view to their rapid replacement so as not to require any prolonged stoppage of the entire clinker cooler.

It is a principal object of this invention is directed to meeting the aforementioned requirements by providing a grate plate for a material conveyor of the type mentioned above, capable of being mounted on the fixed supports or the mobile support of said conveyor.

It is a further object of this invention to provide an improved grate plate and grate support apparatus which provides four point support of the grate and allows easy assembly of the grates to the supports.

The grate plate of the present invention includes an upper surface and a front surface on the downstream side of the grate plate extending downwardly from the upper or top surface. Material to be conveyed is supported on the top surface and the front surface acts as a pusher face so that as some of the rows of grates are reciprocated, the front or pusher face serves to push material onto the next downstream grate thereby advancing material along the conveyor, all in a manner well known in the art. With the grate plate of this invention, a rib on the interior or lower surface of the plate runs transversally with respect to the direction of material transport and is equipped with a flap or tab having an opening therethrough parallel to the length of the grate plate and the longitudinal direction of the conveyor. A fastener cooperates with the support to serve as a means for securing the grate to the support. The grate also includes a lateral wing on each side of the grate, each having a depth substantially equal to the depth of the transversal rib. Each wing includes a detent at one end adapted to cooperate with a respective transversal support bar of the conveyor in a complementary fashion, and a protrusion of the midsection of the grate which cooperates with the support to thereby define a means by which the plate is supported at four spaced apart points.

The other features and advantages of the invention will emerge better from the following description, given here with a view to the attached drawings where:

In these drawings, the same reference numbers refer to the same elements.

Figure 1:
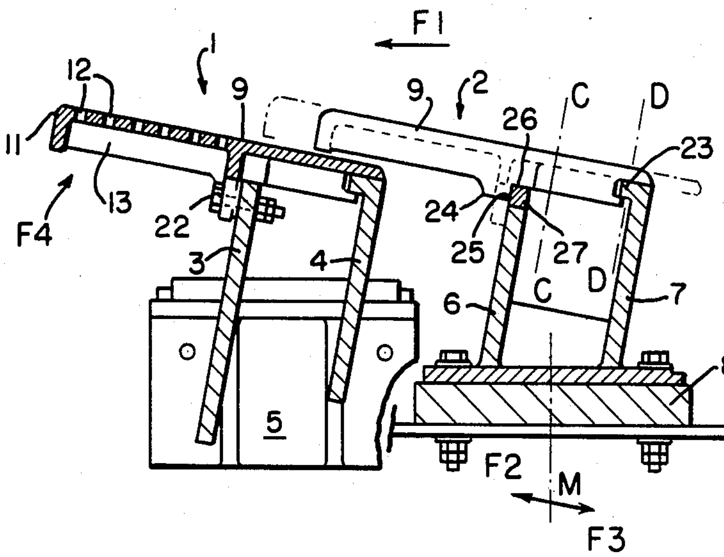
FIG. 1 represents a schematic view, in partial cross-section, of a portion of the transporter illustrating fixed grate plate and a movable grate plate according to the invention, each mounted on their respective support.
Figure 2:
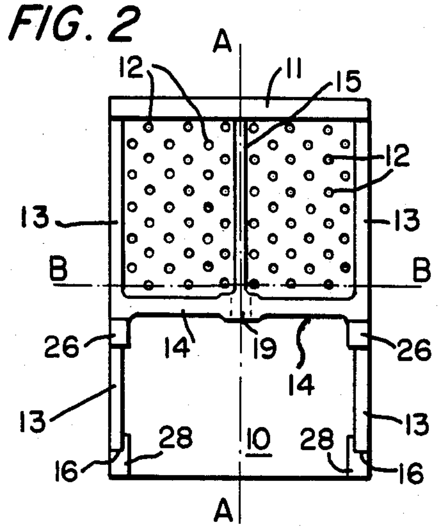
FIG. 2 represents a plan view from below of a plate according to the invention.

Referring first to FIG. 1, a portion of a transporter or material conveyor of the type to which the present invention relates is shown for advancing material in the direction of arrow F1. The conveyor includes rows of fixed grate plates generally indicated by the numeral 1 alternating with rows of movable plates generally indicated by the numeral 2. The fixed and mobile plates are mounted on supports respectively comprising fixed posts 3,4 which are secured to a beam 5, and posts 6, 7 which are secured to frame 8 that is operatively connected to a suitable mechanism known in the art for reciprocating the frame and attached row of grates to either side of a middle position M, parallel to the plate 2 along arrow F2. The forward posts 3 are aligned with each other transversely across the width of the apparatus and the rearward posts are aligned with each other and spaced apart transversely across the width of the conveyor. This is also true of forward posts 6 and rearward posts 7; see FIGS. 6 and 7.

Referring now to FIGS. 1–4, a plate according to the invention has a generally rectangular shape and comprises an upper face 9 which may be flat as shown in FIGS. 1 to 4 for supporting the substance to be transported, a lower face 10 equipped with reinforcements and assembly members, a rounded edge 11 being arranged on the transversal edge, directed in the down-line or downstream transport direction (Arrow F1). The surface 11 defines a pusher surface. For certain applications, such as the conveying of clinkers, the down-line part of the plate, which is not covered up by the adjacent plate, includes openings 12 for blowing in air, said air being directed along arrow F4 from the lower face toward the upper face. These openings in particular can make it possible to air-cool the substance being transported as well as the plate forming a grate or to promote material movement by fluidizing the charge.

According to the invention, the grate plate comprises two lateral wings 13 which are parallel to the longitudinal axis A—A (FIG. 2) and which are essentially perpendicular to the plane of the upper face 9. One wing 13 is on each side of each grate. A transversal rib 14 in an essentially middle position of the grate and connected at its two ends to the respective wings 13. A second rib 15 is also arranged along axis A—A between the downstream edge 11 and the transversal rib 14. Each wing 13 comprises at its rearward end, an end 16 which is slightly shorter length than the upper face 9 in the direction of axis A—A. A cut out or notch 17 is made between the portion of end 16 and the upper face 10 to form a detent for securing the grate to the support as will be hereinafter described.

Transversal rib 14, in its middle portion, includes a flap or tab 18 directed downwardly and having an opening 19 therethrough in the longitudinal direction parallel to axis A—A and whose edge is suitably reinforced by a tooling allowance.

Figure 6:
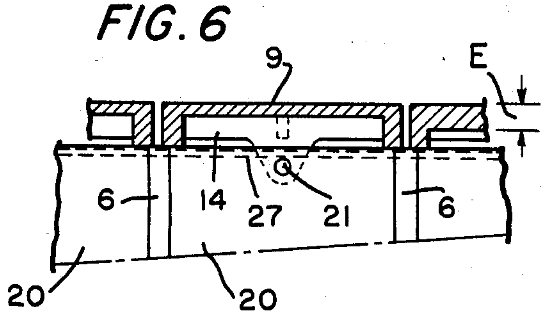
FIG. 6 represents a sectional view of the manner of mounting the plate taken along the line C—C in FIG. 1.
Figure 7:
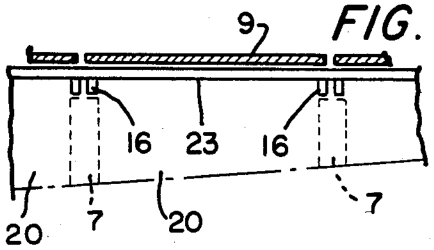
FIG. 7 represents a sectional view taken on the line D—D of FIG. 1 of the manner of mounting the grate plates on the support frame.

As will be explained in greater detail, the disconnect devices or detent 16–17 and the opening 19 constitute the essence of the members for the attachment of the grate to its support Referring to FIGS. 6 and 7, each grate support consists of forward posts 3 or 6 and rearward posts 4 or 7, positioned between two juxtaposed grate plates, in the transversal direction, parallel to axis B—B. In this manner each post supports juxtaposed grates. A plate 20 of suitable thickness is placed between and secured each row of posts 3,4,6 and 7, in the transversal direction across the width of the transport device. The plates are illustrated in FIGS. 6 and 7.

An opening 21 is made in each downstream sheet 20 arranged between forward posts 3 or 6, aligned with the opening 19 of the top 18 of each grate plate to allow passage of an attachment pin 22 or through the openings 19 and 21 to define a means for securing the grate plate to its associated support. Furthermore, between the upstream or rearward posts 4 or 7 and in their upper portion there is arranged a means, forming a protrusion on the side directed toward the downstream post in the form of a transverse bar 23, the upper face of said bar 23 and of the corresponding post being in the same plane. By means of this arrangement, the rearward end of the grate plate is dimensional so that cut-out or notch 17 is complementary in shape and dimension with bar 23 so that the bar fits into the cut out 17 and the end 16 abuts or nearly abuts the upstream post 4 or 7 as the case may be. In this way, to mount a plate in the conveyor, it suffices to engage the cut 17 and to tighten the pin 22. The dismantling operation taking place in the reverse order. The detent in the rearward end of each wing 13 serves to provide support of the grate plate at two spaced apart points.

As indicated earlier, each wing 13 also comprises a second disconnect on the level of the middle rib 14, made up on the one hand of a protrusion 24 extending from the lower surface of the grate plate 9 and equipped with two perpendicular faces 25 and 26. Face 25 is perpendicular to the plane of the top surface 9 of the grate plate, while face 26 runs parallel to said plane. A transversal bar 27, is secured atop a row of supports 6 (FIG. 6) arranged above the faces 26 and complimentary to bar 27. These protrusions serve to support the grate plate at two spaced apart points midsection of the grate.

Under these conditions, each grate is supported at four points. The rear portion of the grate is supported at two points by detent 16 cooperating with bar 23 and the grate resting atop the posts 4 and 7. If desired the rear portion of each grate may have a rib 28 providing reinforcement of the grate. The grate is supported at two points in its mid-section by surfaces 25 and 26 of the two protrusions 24 cooperating with bar 27.

Figure 3:
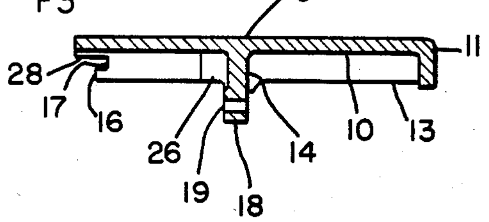
FIG. 3 represents a sectional view along line A—A in FIG. 2.
Figure 4:
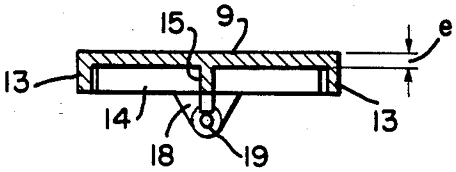
FIG. 4 represents a sectional view along line B—B in FIG. 2.
Figure 5:
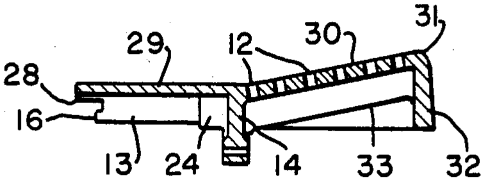
FIG. 5 represents a sectional view along line A—A in FIG. 2 of a variation of the grate plate with the upper face forming a dihedron.

In FIGS. 1, 3 and 4, the top surface of the grate is substantially flat. Referring now to FIG. 5, a variation of the grate plate according to the present invention includes all of the features of the manner of implementation described above with respect to the grate of FIGS. 1 to 4 and 6 and 7 regarding the attachment and support members. If differs simply by virtue of its upper dihedral surface 29, 30 with the junction of the two surfaces 29 and 30 being located at approximately the transversal rib 14. The upstream plane 29 of the dihedron is intended to be essentially perpendicular to the posts 3,4 and 5,6 of the support structure while the down-line plane 30 of the dihedron is pointed toward the downline direction. The rounded edge 31 forms a material spillway which is useful for certain applications, the foot of the pusher face 32 of the spillway being essentially in the same plane as the lower edge of the upline portion of the wings 13, the lower edge 33 of the down-line portion of said wings being parallel to the down-line plane 30 of the dihedron.

The assembly at four points according to the invention presents numerous advantages in addition to the ease and speed of placement and disassembly, especially in view of the fact that the contract surfaces between the plate and the supports are limited. The limited contact between grate plate and support reduces heat transfer between the grates and the supports when the device is used for transporting hot clinker.

It should be noted that the plate is a foundry piece or casting. With the present design, only a minimum of machining operation is required, i.e., at the two protrusions 24 and at detent 16. Without modifying its already advantageous structure and its manner of support at four points, the grate plate can be cast in any variable thickness desired between a small thickness e (FIG. 4) and a higher value E (FIG. 6).

It is of course understood that this invention was described and illustrated here only by way of explanation and without any restrictions and that one having ordinary skill in the art could make any useful modification in it, especially in the area of technical equivalences, without going beyond its framework.

I claim:

1. A grate plate for use in a reciprocating grate type material transport apparatus in which a plurality of juxtaposed grate plates are mounted on supports to form rows of grates wherein movable rows of grates alternate with fixed rows of grates, said supports including forward support post means and rearward supports posts means including a plurality of spaced apart posts and a transverse bar mounted on the forward side of the rearward posts interconnecting the spaced apart posts, said grate plate being a generally rectangular shape and having an upper surface adapted to support the material to be transported, a pusher surface on the front end of the grate plate and a lower surface, the improved grate comprising a transverse rib on the lower surface of the grate plate having a centrally positioned, downwardly projecting tab having an opening therethrough parallel to the length of the grate plate adapted to receive a fastener for securing the grate plate to the support, a lateral wing on each side of the grate plate, each wing having a detent at the rear end of the grate plate defined by a cut out dimension so that the transverse bar fits into the cutout and the rear end of each wing substantially abuts the rearward support post and a protrusion adapted to cooperate with the forward support post means whereby the grate plate is supported at four spaced apart points.

2. A grate plate according to claim 1 wherein the protrusion on each wing has machined surfaces substantially perpendicular to each other which are adapted to cooperate with the forward support post means.

3. A grate plate according to claim 2 wherein each of the wings and the transversal rib are substantially equal in depth.

4. A grate plate according to claim 3 wherein the upper surface of the grate plate is substantially flat for its entire length and the pusher surface is substantially perpendicular to the upper surface.

5. A grate plate according to claim 3 wherein the upper surface of the grate plate forms a dihedral with the junction of the planes that form the dihedral being substantially at the transversal rib.

6. A grate plate according to claim 3 further comprising a longitudinal rib extending between said pusher surface and said transversal rib.

* * * * *